(12) United States Patent
Noda et al.

(10) Patent No.: US 11,235,783 B2
(45) Date of Patent: *Feb. 1, 2022

(54) INFORMATION PROCESSING APPARATUS AND INFORMATION PROCESSING METHOD

(71) Applicant: SONY CORPORATION, Tokyo (JP)

(72) Inventors: Atsushi Noda, Tokyo (JP); Akihito Osato, Kanagawa (JP); Hirotaka Suzuki, Kanagawa (JP); Hideyuki Matsunaga, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/496,657

(22) PCT Filed: Feb. 27, 2018

(86) PCT No.: PCT/JP2018/007213
§ 371 (c)(1),
(2) Date: Sep. 23, 2019

(87) PCT Pub. No.: WO2018/180121
PCT Pub. Date: Oct. 4, 2018

(65) Prior Publication Data
US 2020/0377114 A1 Dec. 3, 2020

(30) Foreign Application Priority Data
Mar. 30, 2017 (JP) .............................. JP2017-067389

(51) Int. Cl.
*B60W 50/14* (2020.01)
*B60K 28/06* (2006.01)
*B60W 40/08* (2012.01)

(52) U.S. Cl.
CPC ............. *B60W 50/14* (2013.01); *B60K 28/06* (2013.01); *B60W 40/08* (2013.01); *B60W 2040/0818* (2013.01); *B60W 2540/26* (2013.01)

(58) Field of Classification Search
CPC ............ B60H 1/00742; B60R 25/1004; B60K 28/06; B60W 2040/0818; B60W 40/08; B60W 50/14; G01C 21/26
See application file for complete search history.

(56) References Cited

U.S. PATENT DOCUMENTS 6,438,472 B1* 8/2002 Tano .................... G07C 5/0858
701/29.6
2009/0318121 A1 12/2009 Marumoto
2012/0277987 A1 11/2012 Marumoto
2016/0033964 A1* 2/2016 Sato ...................... B60K 28/06
701/24

(Continued)

FOREIGN PATENT DOCUMENTS

JP 2002-230696 A 8/2002
JP 2010-238214 A 10/2010

(Continued)

OTHER PUBLICATIONS

International Search Report and Written Opinion of PCT Application No. PCT/JP2018/007213, dated Jun. 5, 2018,12 pages of ISRWO.

*Primary Examiner* — Mirza F Alam
(74) *Attorney, Agent, or Firm* — Chip Law Group

(57) ABSTRACT

A driving information generating section 20 successively generates as driving information diverse types of information indicative of a driving state of a vehicle. A dangerous driving determining section 31 determines whether dangerous driving is underway on the basis of the driving information generated by the driving information generating section 20. A supplementary information acquiring section 32 acquires state supplementary information manually or automatically upon determination of dangerous driving by (Continued)

the dangerous driving determining section 31, and associates the acquired state supplementary information with the result of the determination of dangerous driving. An information communication section 34 transmits the result of the determination of dangerous driving and the state supplementary information to an information management apparatus 40. The information management apparatus 40 can recognize the state of the case in which dangerous driving is underway based on the state supplementary information, and correctly determine validity of the result of the determination of dangerous driving.

13 Claims, 7 Drawing Sheets

(56) References Cited

U.S. PATENT DOCUMENTS

| | | | | |
|---|---|---|---|---|
| 2016/0039426 A1* | 2/2016 | Ricci | ............ | G01S 19/42 |
| | | | | 701/1 |
| 2017/0076395 A1* | 3/2017 | Sedlik | ............ | H04L 67/306 |
| 2019/0056732 A1* | 2/2019 | Aoi | ............ | B60W 50/14 |

FOREIGN PATENT DOCUMENTS

| | | |
|---|---|---|
| JP | 2011-041320 A | 2/2011 |
| JP | 2014-010496 A | 1/2014 |
| JP | 2015-038773 A | 2/2015 |
| JP | 2016-177375 A | 10/2016 |
| WO | 2016/166791 A1 | 10/2016 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/007213 filed on Feb. 27, 2018, which claims priority benefit of Japanese Patent Application No. JP 2017-067389 filed in the Japan Patent Office on Mar. 30, 2017. Each of the above-referenced applications is hereby incorporated herein by reference in its entirety.

TECHNICAL FIELD

The present technology relates to an information processing apparatus and an information processing method for giving notification of a state of a case in which dangerous driving is determined to be underway together with the result of the determination of dangerous driving.

BACKGROUND ART

Recent years have witnessed the widespread availability of services making use of driving information indicative of a state in which a vehicle is driven. For example, according to PTL 1, a vehicle-mounted apparatus transmits driving information including control information regarding vehicle speed, starting, braking, acceleration, deceleration, and steering, for example, to a server. In turn, the server determines the vehicle driving state using the received driving information and transmits reward or punishment points reflecting the result of the determination to the vehicle-mounted apparatus that has originated the driving information. Other services making use of the driving information include one analyzing the risk of an accident based on the driving information and calculating an applicable insurance premium rate on the basis of the result of the analysis.

CITATION LIST

Patent Literature

[PTL 1]
Japanese Patent Laid-Open No. 2002-230696

SUMMARY

Technical Problem

Meanwhile, if dangerous driving is detected by the server on the basis of the driving information including the control information regarding vehicle speed, starting, braking, acceleration, deceleration and steering, for example, it might happen that abrupt deceleration or steering as an appropriate driving operation to avoid an accident is determined to be dangerous driving.

It is therefore an object of the present technology to provide an information processing apparatus and an information processing method for giving notification of the state of the case in which dangerous driving is determined to be underway together with the result of the determination of dangerous driving.

Solution to Problem

According to a first aspect of the present technology, there is provided an information processing apparatus including a dangerous driving determining section configured to determine whether dangerous driving is underway on the basis of driving information, and a supplementary information acquiring section configured to acquire state supplementary information upon determination of dangerous driving by the dangerous driving determining section.

According to the present technology, the dangerous driving determining section determines whether dangerous driving is underway on the basis of the driving information. Upon determination of dangerous driving, the supplementary information acquiring section acquires the state supplementary information. Given the determination of dangerous driving, the supplementary information acquiring section issues by image or by sound an information acquisition instruction to acquire the state supplementary information at a predetermined instruction timing, such as immediately after the determination of dangerous driving, at vehicle stop after the determination of dangerous driving, during traveling at a low level of driving difficulty, or at driving stop after the determination of dangerous driving. Also, the supplementary information acquiring section presents the driving information at the time of the determination of dangerous driving. The driving information includes a captured peripheral image, for example. The supplementary information acquiring section performs subject recognition using the captured peripheral image and, upon issuing the information acquisition instruction, presents the captured peripheral image in which a recognized subject is provided with a tag.

The information acquisition instruction is issued as an instruction to acquire an objection to the determination of dangerous driving by image, by sound, or by character. In a case where a passenger is on board, the supplementary information acquiring section issues the information acquisition instruction to the passenger. The supplementary information acquiring section may further include a communication section configured to communicate with an external device such as a vehicle positioned nearby so as to acquire as the state supplementary information the driving information regarding the nearby vehicle at the time of the determination of dangerous driving.

An information recording section is provided to record the acquired state supplementary information in association with the result of the determination of dangerous driving. The result of the determination of dangerous driving is arranged to include the driving information covering a predetermined time period in reference to the timing of the determination of dangerous driving.

An information transmitting section is provided to transmit to an information management apparatus the result of the determination of dangerous driving and the state supplementary information at a predetermined transmission timing, such as at a predetermined date and time, upon elapse of a predetermined time period, at a time at which an instruction is issued to request or transmit the information, or at a time at which the amount of the information recorded in the information recording section has reached a predetermined level.

According to a second aspect of the present technology, there is provided an information processing method including: causing a dangerous driving determining section to determine whether dangerous driving is underway on the basis of driving information; and causing a supplementary information acquiring section to acquire state supplementary information upon determination of dangerous driving by the dangerous driving determining section.

Advantageous Effect of Invention

According to the present technology, the state supplementary information is acquired upon determination of dangerous driving based on the driving information. Therefore, the information management apparatus is notified of the state of the case in which dangerous driving is determined to be underway based on the state supplementary information, together with the result of the determination of dangerous driving. Note that, the advantageous effects stated in this description are only examples and not limitative of the present technology that may also provide other advantages.

DESCRIPTION OF EMBODIMENTS

Figure 1:
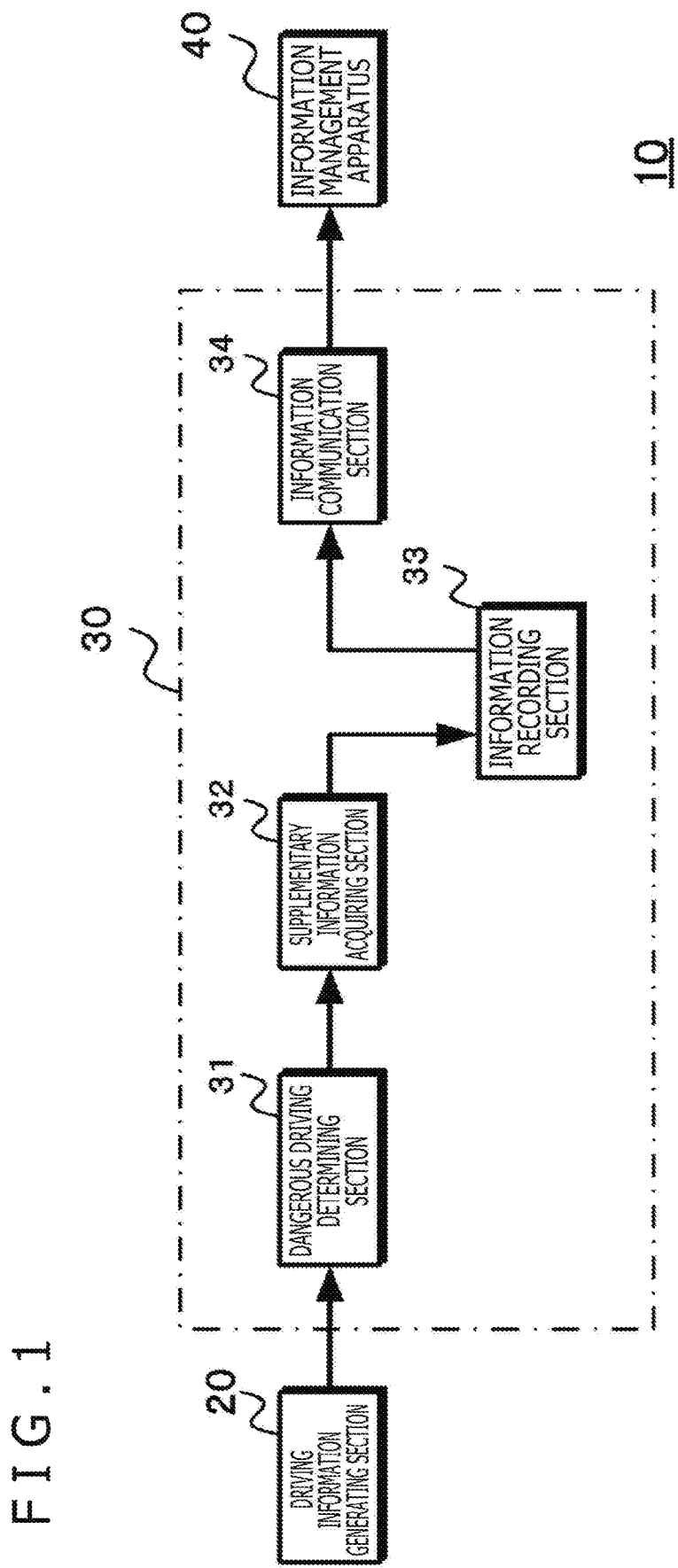
FIG. 1 is a schematic diagram depicting a configuration of an information collection system.

The embodiments for implementing the present technology are described below. The description will be given under the following headings:

1. Configuration and operations of an information collection system
2. Configuration and operations in a case where an information processing apparatus is mounted on a vehicle
3. Configuration and operations of an information management apparatus
4. Other configurations and operations of the information processing apparatus 1. Configuration and Operations of an Information Collection System FIG. 1 schematically depicts a configuration of an information collection system that uses an information processing apparatus according to the present technology. An information collection system 10 includes a driving information generating section 20, an information processing apparatus 30, and an information management apparatus 40.

The driving information generating section 20 successively generates, as driving information, diverse types of information indicative of a driving state of a vehicle. The driving information generating section 20 also adds to the driving information the information indicative of the date and time at which the information indicative of the driving state was acquired. The driving information generating section 20 may further add to the driving information the position information indicative of the position at which the information indicating the drive state was acquired. The driving information generating section 20 outputs the generated driving information to the information processing apparatus 30.

The information processing apparatus 30 includes a dangerous driving determining section 31, a supplementary information acquiring section 32, an information recording section 33, and an information communication section 34.

The information processing apparatus 30 may be configured to be mounted on the vehicle either fixedly or detachably. Alternatively, the information processing apparatus 30 may be configured to be installed separately from the vehicle and to acquire the driving information from the vehicle by communicating therewith.

The dangerous driving determining section 31 determines whether dangerous driving is underway on the basis of the driving information generated by the driving information generating section 20, and outputs the result of the determination of dangerous driving to the supplementary information acquiring section 32. Also, the dangerous driving determining section 31 adds to the result of the determination of dangerous driving vehicle information (e.g., vehicle number) or driver information (e.g., license number) so as to identify the vehicle or its driver. The dangerous driving determining section 31 may further add to the result of the determination of dangerous driving the driving information covering a predetermined time period in reference to the timing at which dangerous driving was determined to be underway, e.g., driving information covering a predetermined time period before and after the timing of the determination of dangerous driving.

The supplementary information acquiring section 32 acquires state supplementary information upon determination of dangerous driving by the dangerous driving determining section 31. The supplementary information acquiring section 32 may have the state supplementary information acquired either manually or automatically. In a case where the state supplementary information is to be manually acquired, the supplementary information acquiring section 32 notifies the user (driver or passenger) by image or by sound that dangerous driving is determined to be underway. The supplementary information acquiring section 32 also notifies the user that an objection to the determination of dangerous driving is acceptable as the state supplementary information. The supplementary information acquiring section 32 acquires as the state supplementary information the objection indicated by image, by sound, or by character through the use of a camera, a microphone, or a touch panel or the like. In a case where the state supplementary information is to be automatically acquired, the supplementary information acquiring section 32 communicates, for example, with a vehicle positioned nearby (referred to as the nearby vehicle hereunder) upon determination of dangerous driving and acquires the driving information regarding the nearby vehicle or a capture peripheral image obtained by the nearby vehicle as the state supplementary information. Alternatively, upon determination of dangerous driving, the supplementary information acquiring section 32 may communicate with a monitoring camera installed nearby and acquire captured images generated by the monitoring camera as the state supplementary information. The supplementary information acquiring section 32 outputs the acquired state supplementary information to the information recording section 33 in association with the result of the determination of dangerous driving. The association here permits references to the state supplementary information regarding the result of the determination of dangerous driving at the time of using that result. For example, the association includes putting the result of the determination of dangerous driving and the state supplementary information into the same file and permitting readout of the state supplementary information at the time of reading the result of the determination of dangerous driving even if that result and the state supplementary information are in separate files.

The information recording section 33 writes to a recording medium the result of the determination of dangerous driving and the state supplementary information associated therewith. Note that, the recording medium may be attached to the information recording section 33 either fixedly or detachably.

The information communication section 34 acquires from the information recording section 33 the result of the determination of dangerous driving and the state supplementary information and transmits what are thus acquired to the information management apparatus 40 at a predetermined transmission timing. For example, the information communication section 34 may perform the transmission at a predetermined date and time, at the timing at which the information management apparatus 40 requests the transmission, or at the timing designated by the driver.

The information management apparatus 40 acquires the result of the determination of dangerous driving and the state supplementary information from the information processing apparatus 30. The result of the determination of dangerous driving and the state supplementary information may alternatively be acquired via the information communication section 34 or by use of the recording medium. The information management apparatus 40 determines the validity of the result of the determination of dangerous driving based on the state supplementary information. Even if dangerous driving is determined to be underway on the basis of the driving information, the information management apparatus 40 invalidates the determination of dangerous driving when the state supplementary information has clearly revealed the driving operation or the like to be appropriate.

Figure 2:
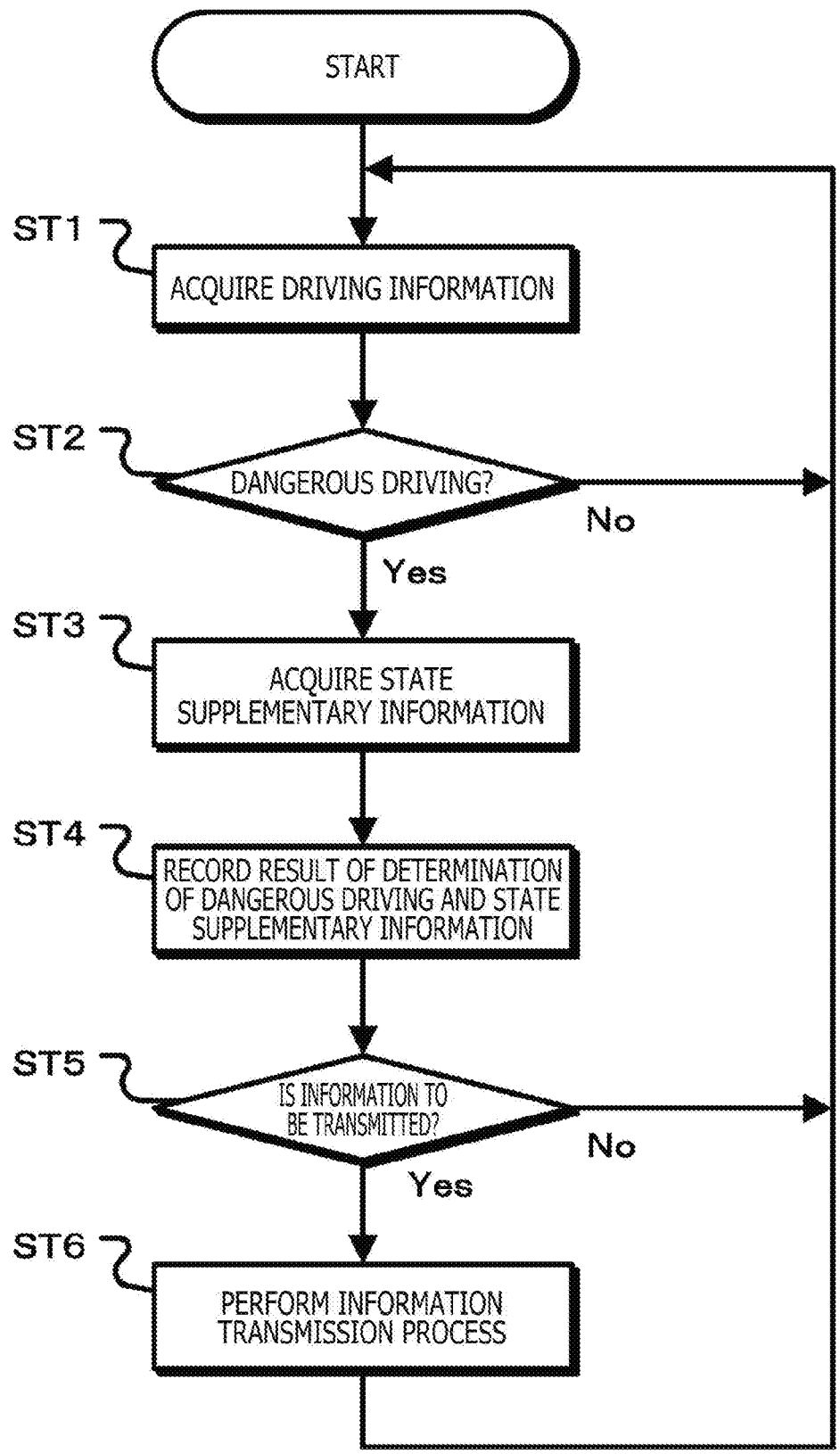
FIG. 2 is a flowchart depicting exemplary operations of an information processing apparatus.

FIG. 2 is a flowchart depicting exemplary operations of the information processing apparatus. In step ST1, the information processing apparatus acquires driving information. The dangerous driving determining section 31 in the information processing apparatus acquires the driving information indicative of the vehicle driving state from the driving information generating section 20, before going to step ST2.

In step ST2, the information processing apparatus determines whether dangerous driving is underway. The dangerous driving determining section 31 in the information processing apparatus determines whether dangerous driving is underway on the basis of the driving information acquired in step ST1. In the case where dangerous driving is not determined to be underway, the dangerous driving determining section 31 returns to step ST1. Upon determining that dangerous driving is underway, the dangerous driving determining section 31 goes to step ST3.

In step ST3, the information processing apparatus acquires state supplementary information. Upon determination of dangerous driving by the dangerous driving determining section 31, the supplementary information acquiring section 32 in the information processing apparatus has the state supplementary information acquired manually or automatically, before going to step ST4.

Figure 3:
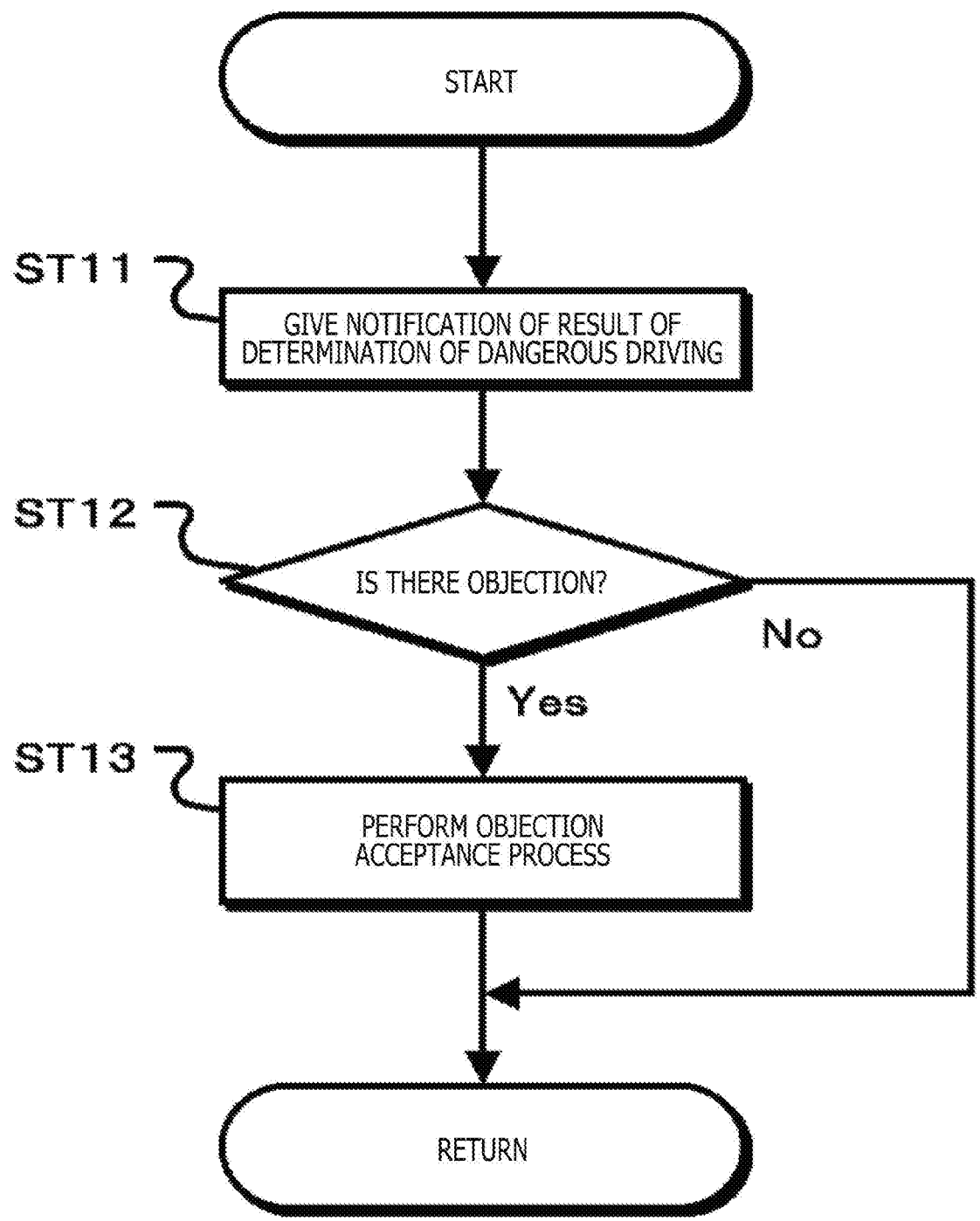
FIG. 3 is a flowchart depicting operations in a case where state supplementary information is acquired manually.

FIG. 3 is a flowchart depicting operations in a case where the state supplementary information is acquired manually. In step ST11, the supplementary information acquiring section gives notification of the result of the determination of dangerous driving. The supplementary information acquiring section 32 notifies the user by image or by sound that dangerous driving is determined to be underway. In this case, if the user is presented with the driving information at the time of the determination of dangerous driving, the user understands the reason for the determination of dangerous driving. The supplementary information acquiring section 32 issues by image or by sound an information acquisition instruction to acquire the state supplementary information, before going to step ST12.

In step ST12, the supplementary information acquiring section determines whether there is an objection to the result of the determination of dangerous driving. In a case where the supplementary information acquiring section 32 determines that the user, notified of the result of the determination of dangerous driving in step ST11, has performed operations to object to that result, the supplementary information acquiring section 32 goes to step ST13. In a case where the user does not perform operations to make the objection, the supplementary information acquiring section 32 goes to step ST4 in FIG. 2.

In step ST13, the supplementary information acquiring section performs an objection acceptance process. The supplementary information acquiring section 32 acquires the objection made by the user by image, by sound, or by character as the state supplementary information, before going to step ST4 in FIG. 2.

In step ST4 of FIG. 2, the information processing apparatus records the result of the determination of dangerous driving and the state supplementary information. The information recording section 33 in the information processing apparatus writes to a recording medium the result of the determination of dangerous driving and the state supplementary information associated therewith, before going to step ST5.

In step ST5, the information processing apparatus determines whether or not to transmit information. In a case where a predetermined transmission timing is reached, the information communication section 34 in the information processing apparatus goes to step ST6. While the predetermined transmission timing has yet to be reached, the information communication section 34 returns to step ST1.

In step ST6, the information processing apparatus performs an information transmission process. The information communication section 34 in the information processing apparatus transmits to the information management apparatus 40 the result of the determination of dangerous driving and the state supplementary information associated therewith, before returning to step ST1.

Whereas the example in FIG. 3 indicates that the state supplementary information is acquired upon determination of dangerous driving, in the case where the state supplementary information is to be manually acquired, the supplementary information acquiring section 32 may issue the information acquisition instruction at a predetermined instruction timing. For example, if the information acquisition instruction is issued at vehicle stop after the determination of dangerous driving, the user can input the state supplementary information (i.e., an objection to the result of the determination of dangerous driving) upon elapse of a short time period following the determination of dangerous driving and in a state where there is little danger of accidents. Alternatively, the information acquisition instruction may be issued during traveling at a low level of driving difficulty (e.g., during driving on a straight road). As another alternative, the information acquisition instruction may be issued at driving stop following determination of dangerous driving. This makes it possible to input the state supplementary information without jeopardizing driving safety.

In a case where the state supplementary information is to be acquired upon determination of dangerous driving, the supplementary information acquiring section 32 may instruct a passenger on board to acquire the information so that the driver can concentrate on driving the vehicle.

Therefore, according to the present technology, upon determination of dangerous driving, the information management apparatus is provided with the user's objection to the determination of dangerous driving and with the driving information regarding the nearby vehicle as the state supplementary information supplementing the result of the determination. This allows the information management apparatus to verify the validity of the result of the determination of dangerous driving on the basis of the state supplementary information. As a result, the granting of incentives in keeping with the result of the determination of dangerous driving (e.g., how the insurance premium is reduced or how benefits are offered) can improve the user's satisfaction.

2. Configuration and Operations in a Case where the Information Processing Apparatus is Mounted on a Vehicle Explained below is a case in which the technology of the present disclosure is applied to one of various types of vehicles such as automobiles, electric vehicles, hybrid electric vehicles, and motorcycles.

Figure 4:
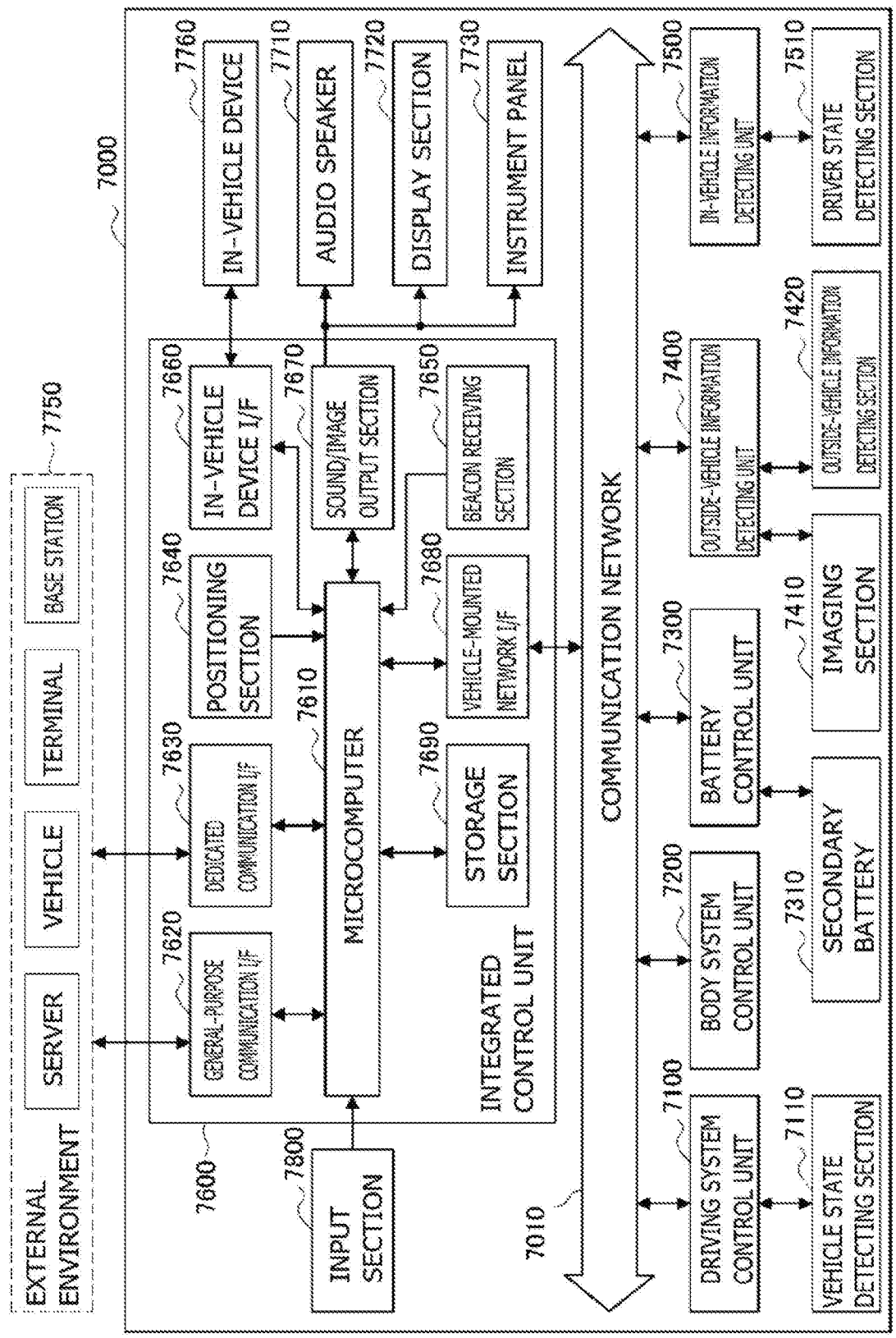
FIG. 4 is a block diagram depicting an example of schematic configuration of a vehicle control system.

FIG. 4 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 4, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 4 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 5:
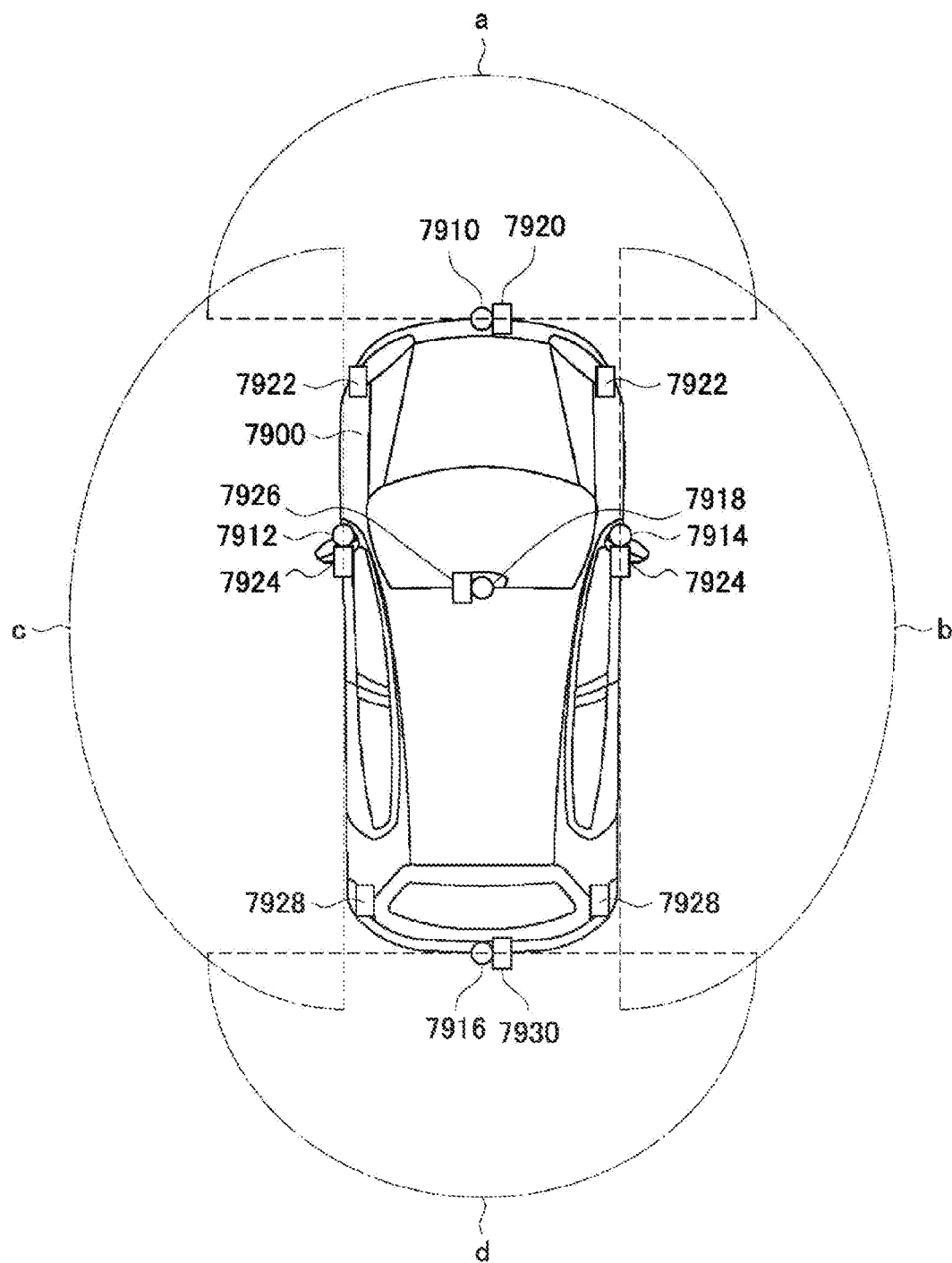
FIG. 5 is a diagram of assistance in explaining an example of installation positions of an outside-vehicle information detecting section and an imaging section.

FIG. 5 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 5 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 4, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 4, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 4 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In a case where the information processing apparatus according to the present technology is implemented in the vehicle control system 7000 depicted in FIG. 4, the driving information generating section 20 is configured using the vehicle state detecting section 7110, the imaging section 7410, and the outside-vehicle information detecting section 7420. The microcomputer 7610 is used as the dangerous driving determining section 31. The supplementary information acquiring section 32 is configured using the microcomputer 7610, the dedicated communication I/F 7630, the sound/image output section 7670, the audio speaker 7710, the display section 7720, and the input section 7800. The storage section 7690 is used as the information recording section 33. Furthermore, the information communication section 34 is configured using the microcomputer 7610 and the general-purpose communication I/F 7620.

The driving information generating section 20 uses, as the driving information, acceleration of the vehicle, accelerator pedal operations, brake pedal operations, steering angle of the steering wheel, engine speed, or rotational speed of the wheels detected by the vehicle state detecting section 7110. The driving information generating section 20 may also use captured images generated by the imaging section 7410 as the driving information. Furthermore, the driving information generating section 20 may use as the driving information the result of the detection of current atmospheric conditions or weather conditions, nearby vehicles, obstacles, or pedestrians detected by the outside-vehicle information detecting section 7420. Note that, the integrated control unit 7600 includes a clock section (not depicted) that allows date and time information to be included in the driving information. The position information generated by the positioning section 7640 may also be included in the driving information.

The microcomputer 7610 having the function of the dangerous driving determining section 31 determines whether dangerous driving is underway based on the result of the detection by the vehicle state detecting section 7110, on the captured images generated by the imaging section 7410, and on the result of the detection by the outside-vehicle information detecting section 7420. Here, dangerous driving refers to sudden acceleration or deceleration, excessive speed, abrupt steering, and short inter-vehicle distance, for example. The dangerous driving determining section 31 outputs the result of the determination of dangerous driving to the supplementary information acquiring section 32. Also, the dangerous driving determining section 31 adds vehicle information (e.g., vehicle number) or driver information (e.g., license number) to the result of the determination of dangerous driving. Furthermore, the dangerous driving determining section 31 may add to the result of the determination of dangerous driving the driving information covering a predetermined time period in reference to the timing of the determination of dangerous driving, e.g., a predetermined time period before and after the timing of the determination.

Upon determination of dangerous driving by the dangerous driving determining section 31, the supplementary information acquiring section 32 acquires state supplementary information. For example, in the case where the state supplementary information is to be manually acquired, the microcomputer 7610 controls the sound/image output section 7670 to notify the user, by image or by sound, of the result of the determination of dangerous driving through the use of the audio speaker 7710 and display section 7720. The microcomputer 7610 may also notify the user of the result of the determination of dangerous driving together with the driving information at the time of the determination of dangerous driving, allowing the user to recognize what caused the determination of dangerous driving. For example, the user may be presented with the cause of the determination of dangerous driving as well as the criteria for the determination by graphs (e.g., graphs indicative of transitions in acceleration and deceleration) and by characters (e.g., information indicative of driving operations and inter-vehicle distances) or by sound (e.g., voice explaining why dangerous driving was determined to be underway). When presented with the cause of the determination of dangerous driving in this manner, the user can recognize which driving operation led to the determination of dangerous driving. In turn, the user can make an appropriate objection to the result of the determination of dangerous driving. Then the microcomputer 7610 issues the information acquisition instruction at a predetermined instruction timing. The predetermined instruction timing may include a time immediately after dangerous driving was determined to be underway, a time at which the vehicle was stopped upon determination of dangerous driving, a time period of traveling at a low level of driving difficulty, or a time after which driving was terminated following the determination of dangerous driving. Note that, the level of driving difficulty is assumed to be high during traveling on a freeway, on a sinuous road or on an inner-city road, and assumed to be low during easy driving such as on a straight road in the suburbs. When the information acquisition instruction is issued in this manner, the user recognizes that he or she is given the opportunity to make an objection to the result of the determination of dangerous driving. Issuing the information acquisition instruction involves requesting the user to gather evidence at the site where dangerous driving was determined to be underway. The evidence-gathering request may involve requesting the user to take pictures of the site where dangerous driving was determined to be underway, collect the testimony (in sentence or in voice) of witnesses of the situation upon determination of dangerous driving, and collect the testimony of the opposite party if there is one. Issuing the information acquisition instruction may also involve prompting the user to input the objection by image, by sound, or by sentence.

Figure 6:
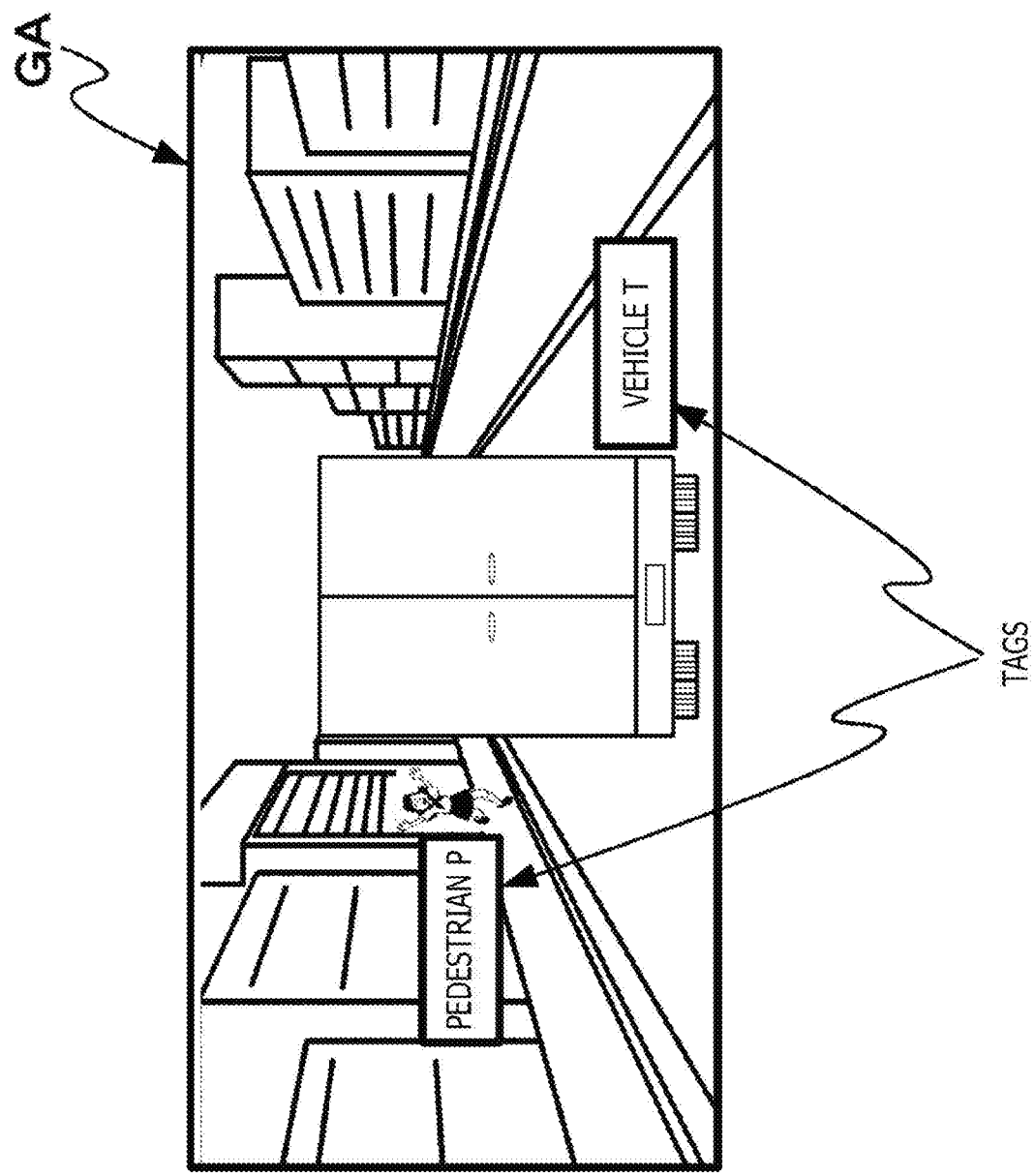
FIG. 6 is a schematic diagram depicting an image provided with tags.

Furthermore, issuing the information acquisition instruction may involve presenting the user with the driving information (e.g., images captured by the imaging section 7410 and outside-vehicle information detecting section 7420) covering a predetermined time period in reference to the timing of the determination of dangerous driving so as to prompt the user to input the objection by sentence or by sound. In a case where the captured image obtained by the imaging section 7410 or by the outside-vehicle information detecting section 7420 is to be presented, the microcomputer 7610 may perform object recognition using the captured image, furnish the recognized objects with tags therein, and have the objects presented by the display section 7720. FIG. 6 depicts an image provided with tags. In object recognition, mobile objects (e.g., vehicles and pedestrians) are recognized using a captured image GA acquired by the imaging section 7918 depicted in FIG. 5, the recognized objects being provided with tags in a manner ensuring individual distinction. In the example of FIG. 6, a vehicle and a pedestrian are recognized and provided with a tag "Vehicle T" and a tag "Pedestrian P" respectively. When presented with the driving information in which the recognized objects are tagged as described above, the user can make an objection easily and appropriately to the result of the determination of dangerous driving by use of the tags.

The input section 7800 is configured with a touch panel and a microphone, for example. The input section 7800 acquires the objection (e.g., testimony of witnesses) input by the user as the state supplementary information.

In the case where the state supplementary information is to be automatically acquired, the microcomputer 7610 communicates with an external device positioned nearby using the dedicated communication I/F 7630, for example, in order to acquire the state supplementary information automatically. In a case where the external device is a nearby vehicle, for example, the microcomputer 7610 acquires from the nearby vehicle the driving information covering a predetermined time period in reference to the timing of the determination of dangerous driving as the state supplementary information. In a case where the external device is a monitoring camera, the microcomputer 7610 acquires therefrom the captured images covering a predetermined time period in reference to the timing of the determination of dangerous driving as the state supplementary information. The state supplementary information may be automatically acquired immediately after dangerous driving was determined to be underway. As another alternative, the microcomputer 7610 may present the user with the result of the determination of dangerous driving immediately after dangerous driving was determined to be underway and, in a case where user issues an instruction to acquire the state supplementary information, may acquire the information automatically by communicating with the external device.

Apart from the case where the driver is notified of the result of the determination of dangerous driving or is given the information acquisition instruction, if there is a passenger on board, the supplementary information acquiring section 32 may notify the passenger of the result of the determination of dangerous driving or may instruct the passenger to acquire the information. In this case, the driver can concentrate on driving operation.

The storage section 7690 used as the information recording section 33 records the acquired state supplementary information in association with the result of the determination of dangerous driving. The recording medium of the storage section 7690 may be attached thereto either fixedly or detachably.

The information communication section 34 transmits the result of the determination of dangerous driving and the state supplementary information to the information management apparatus 40 at a predetermined transmission timing. The microcomputer 7610 communicates with the information management apparatus 40 at a predetermined transmission timing using the general-purpose communication I/F 7620, for example, thereby transmitting the result of the determination of dangerous driving and the state supplementary information stored in the storage section 7690 to the information management apparatus 40. Note that, the predetermined transmission timing may include a date and time established beforehand, a time upon elapse of a predetermined time period, a time at which an instruction is issued to request or transmit the information, or a time at which the amount of the information including the result of the determination of dangerous driving and the state supplementary information stored in the storage section 7690 has reached a predetermined level.

The result of the determination of dangerous driving and the state supplementary information may not be offered to the information management apparatus 40 only via the information communication section 34. For example, In a case where the recording medium of the storage section 7690 is attached thereto detachably, the recording medium on which the result of the determination of dangerous driving and the state supplementary information are recorded may be shipped to the information management apparatus side so that what is recorded on the recording medium is made available to the information management apparatus from the shipped medium.

The vehicle control system in which the information processing apparatus is implemented is not limited to the configuration depicted in FIG. 4. The vehicle control system may alternatively include functional blocks providing other functions. As another alternative, the vehicle control system may exclude some of the functions illustrated in FIG. 4.

3. Configuration and Operations of an Information Management Apparatus

Figure 7:
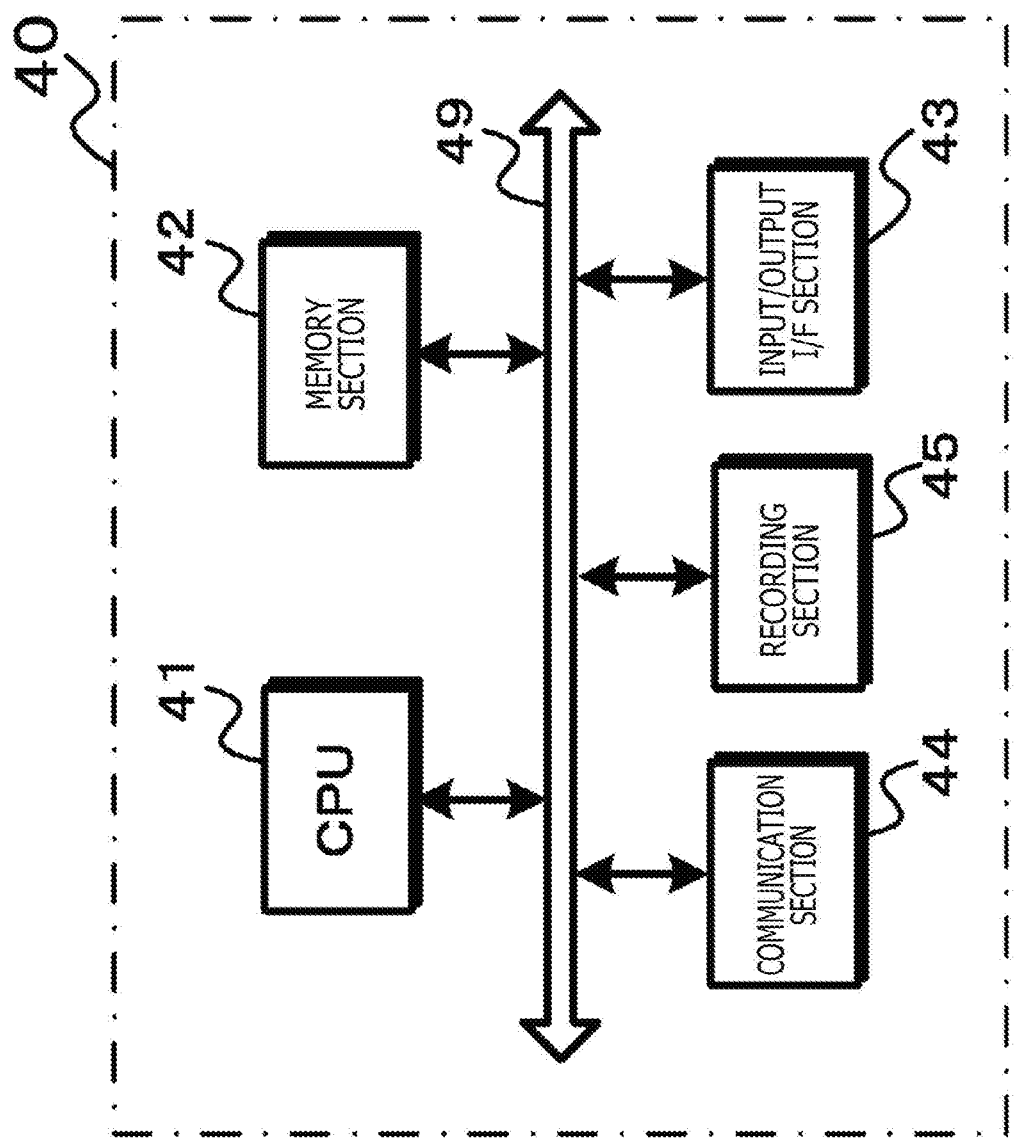
FIG. 7 is a schematic diagram depicting an exemplary configuration of an information management apparatus.

FIG. 7 schematically depicts an exemplary configuration of the information management apparatus. The information management apparatus 40 includes a CPU 41, a memory section 42, an input/output interface (I/F) section 43, a communication section 44, and a recording section 45, for example. These sections are interconnected via a bus 49. The CPU 41 executes programs recorded in the memory section 42 so as to acquire the result of the determination of dangerous driving and the state supplementary information from the information processing apparatus 30 via the communication section 44, for example. Furthermore, using the input/output I/F section 43, the CPU 41 presents an information administrator with the state supplementary information associated with the result of the determination of dangerous driving so that the administrator can determine whether that result of the determination is valid. Also, based on the determination of whether the result of the determination of dangerous driving is valid, the CPU 41 grants incentives to the vehicle or to its driver.

The memory section 42 is configured using a RAM (Random Access Memory) or a ROM (Read-Only Memory). The memory section 42 stores the programs by which the information management apparatus 40 performs necessary processes. The memory section 42 is further used as a work memory with which diverse processing is carried out.

The input/output I/F section 43 is configured using a display section and an input section, for example. The display section is configured using liquid display elements or organic EL display elements, for example, and displays the information recorded in the recording section 45 or the information processed by the CPU 41 or the like. The input section is configured using a keyboard, a mouse, and a touch panel, for example, and accepts operations made by the user.

The communication section 44 communicates with the information processing apparatus 30 to acquire the result of the determination of dangerous driving and the state supplementary information from the apparatus. The recording section 45 is typically configured using a hard disk or a nonvolatile memory, and records the result of the determination of dangerous driving and the state supplementary information acquired from the information processing apparatus 30. Note that, the configuration of the information management apparatus 40 is not limited to what is depicted in FIG. 7 and may include functional blocks providing other functions.

The information management apparatus 40 configured as described above thus acquires the result of the determination of dangerous driving and the state supplementary information from the information processing apparatus 30. The state supplementary information associated with the result of the determination of dangerous driving allows the information management apparatus 40 to determine whether the result of that determination is valid. Consequently, the granting of incentives based on the result of the determination of dangerous driving improves the user's satisfaction when the user uses a vehicle.

4. Other Configurations and Operations of the Information Processing Apparatus Explained below is a case where the information processing apparatus is installed separately from the vehicle. A mobile communication terminal apparatus (e.g., smartphone or tablet) includes a communication section that communicates with sensors or an external device capable of acquiring captured images, acceleration information, and position information, for example. The mobile communication terminal apparatus also includes a microcomputer, a display section, an input section, and a recording section. Therefore, the mobile communication terminal apparatus may be used as the information processing apparatus according to the present technology. In this case, the information acquired by the sensors of the mobile communication terminal apparatus is utilized as the driving information. Also, the microcomputer of the mobile communication terminal apparatus is used to determine whether dangerous driving is underway. The display section and input section of the mobile communication terminal apparatus are used to acquire the state supplementary information. The recording section of the mobile communication terminal apparatus is used to record the state supplementary information in association with the result of the determination of dangerous driving. The communication section of the mobile communication terminal apparatus is used to transmit to the information management apparatus the result of the determination of dangerous driving and the state supplementary information recorded in the recording section. Note that, the vehicle information and the driving information that are not acquired by the sensors are obtained from the vehicle using the communication section.

Where the mobile communication terminal apparatus is used as the information processing apparatus, it is possible to provide the information management apparatus with the result of the determination of dangerous driving and the state supplementary information even if a vehicle not provided with the information processing apparatus is to be driven.

The series of the processes explained in this description may be executed by hardware, by software, or by combination of both. In a case where the software-based processing is to be carried out, the programs recording the process sequences involved may be installed into an internal memory of a computer in dedicated hardware for program execution. Alternatively, the programs may be installed into a general-purpose computer capable of performing diverse processes for execution of the programs.

For example, the programs may be recorded beforehand on a hard disk, an SSD (Solid-State Drive), or a ROM (Read-Only Memory) serving as recording media. Alternatively, the programs may be stored (recorded) temporarily or permanently on such removable recording media as a flexible disk, a CD-ROM (Compact Disc Read Only Memory), an MO (Magneto-optical) disc, a DVD (Digital Versatile Disc), a BD (Blu-Ray Disc (registered trademark)), a magnetic disk, and a semiconductor memory card. These removable recording media may be offered as so-called packaged software.

As another alternative, besides being installed from the removable recording media into the computer, the programs may be transferred to the computer from download sites via networks such as LANs (local area networks) and the Internet. The computer receives the transferred programs and installs them onto internal recording media such as a hard disk.

The advantageous effects stated in this description are only examples and are not limitative of the present technology. There may be additional advantageous effects derived from and not covered by this description. The present technology is not limited to the embodiments discussed above, and has been disclosed in the form of illustrations. It is evident that many alternatives, modifications and variations of the embodiments will become apparent to those skilled in the art without departing from the spirit and scope of this technology. Accordingly, the scope of the present technology should be determined in consideration of the appended claims.

The present disclosure may be implemented preferably in the following configurations:

(1)

An information processing apparatus including:

a dangerous driving determining section configured to determine whether dangerous driving is underway on the basis of driving information; and a supplementary information acquiring section configured to acquire state supplementary information upon determination of dangerous driving by the dangerous driving determining section.

(2)

The information processing apparatus according to (1), in which the supplementary information acquiring section issues an information acquisition instruction to acquire the state supplementary information following the determination of dangerous driving.

(3)

The information processing apparatus according to (2), in which the supplementary information acquiring section issues the information acquisition instruction by image or by sound.

(4)

The information processing apparatus according to (3), in which the supplementary information acquiring section presents driving information at the time of the determination of dangerous driving.

(5)

The information processing apparatus according to (4), in which the driving information includes a captured peripheral image, and the supplementary information acquiring section performs subject recognition using the captured peripheral image and, upon issuing the information acquisition instruction, presents the captured peripheral image in which a recognized subject is provided with a tag.

(6)

The information processing apparatus according to any one of (2) to (5), in which the supplementary information acquiring section issues the information acquisition instruction at a predetermined instruction timing including a time immediately after the determination of dangerous driving, a time of vehicle stop after the determination of dangerous driving, a time of traveling at a low level of driving difficulty, or a time of driving stop after the determination of dangerous driving.

(7)

The information processing apparatus according to any one of (2) to (6), in which the supplementary information acquiring section issues the information acquisition instruction to a passenger on board.

(8)

The information processing apparatus according to any one of (2) to (7), in which the supplementary information acquiring section issues as the information acquisition instruction an instruction to acquire an objection to the determination of dangerous driving by image, by sound, or by character.

(9)

The information processing apparatus according to any one of (1) to (8), in which the supplementary information acquiring section includes a communication section configured to communicate with an external device positioned nearby so as to acquire the state supplementary information from the external device.

(10)

The information processing apparatus according to (9), in which the external device is a nearby vehicle, and the supplementary information acquiring section acquires as the state supplementary information the driving information at the time of the determination of dangerous driving.

The information processing apparatus according to any one of (1) to (10), further including:

an information recording section configured to record the state supplementary information acquired by the supplementary information acquiring section in association with the result of the determination of dangerous driving acquired by the dangerous driving determining section.

(12)

The information processing apparatus according to (11), in which the supplementary information acquiring section adds to the result of the determination of dangerous driving the driving information covering a predetermined time period in reference to the timing of the determination of dangerous driving.

(13)

The information processing apparatus according to any one of (1) to (12), further including:

an information transmitting section configured to transmit to an information management apparatus the result of the determination of dangerous driving and the state supplementary information recorded in the information recording section.

(14)

The information processing apparatus according to (13), in which the information transmitting section transmits the result of the determination of dangerous driving and the state supplementary information associated therewith to the information management apparatus at a predetermined transmission timing including a predetermined date and time, a time upon elapse of a predetermined time period, a time at which an instruction is issued to request or transmit the information, or a time at which the amount of the information recorded in the information recording section has reached a predetermined level.

INDUSTRIAL APPLICABILITY

According to the information processing apparatus and the information processing method of the present technology, the state supplementary information is acquired upon determination of dangerous driving based on the driving information. This makes it possible to notify the information management apparatus of the state of the case in which dangerous driving is determined to be underway based on the state supplementary information, together with the result of the determination of dangerous driving. As a result, services offered by use of the present technology for granting incentives in keeping with the driving state of the vehicle can provide the services with high satisfaction to a user.

REFERENCE SIGNS LIST

10 . . . Information collection system
20 . . . Driving information generating section
30 . . . Information processing apparatus
31 . . . Dangerous driving determining section
32 . . . Supplementary information acquiring section
33 . . . Information recording section
34 . . . Information communication section
40 . . . Information management apparatus
41 . . . CPU
42 . . . Memory section 43 . . . Input/output interface (I/F) section
44 . . . Communication section
45 . . . Recording section
49 . . . Bus

The invention claimed is:

1. An information processing apparatus, comprising:
a dangerous driving determining section configured to determine dangerous driving is underway based on driving information,
wherein the driving information includes a first image; and
a supplementary information acquiring section configured to:
recognize a subject from the first image;
issue an information acquisition instruction based on the determination of the dangerous driving by the dangerous driving determining section,
wherein the issuance of the information acquisition instruction includes presentation of the first image in which the recognized subject is provided with a tag; and
acquire, based on the presentation of the first image in which the recognized subject is provided with the tag, state supplementary information that indicates a user objection to the determination of the dangerous driving.

2. The information processing apparatus according to claim 1, wherein the supplementary information acquiring section is further configured to present the driving information at a time of the determination of the dangerous driving.

3. The information processing apparatus according to claim 1, wherein
the supplementary information acquiring section is further configured to issue the information acquisition instruction at an instruction timing, and
the instruction timing comprises at least one of a time immediately after the determination of the dangerous driving, a time of vehicle stop after the determination of the dangerous driving, a time of traveling at a low level of driving difficulty, or a time of driving stop after the determination of the dangerous driving.

4. The information processing apparatus according to claim 1, wherein the supplementary information acquiring section is further configured to issue the information acquisition instruction to a passenger on board.

5. The information processing apparatus according to claim 1, wherein the state supplementary information corresponds to at least one of a second image, a sound, or a character.

6. The information processing apparatus according to claim 1, wherein the supplementary information acquiring section includes a communication section configured to:
communicate with an external device positioned nearby to the information processing apparatus; and
acquire the state supplementary information from the external device based on the communication.

7. The information processing apparatus according to claim 6, wherein
the external device is a nearby vehicle, and
the supplementary information acquiring section is further configured to acquire the driving information associated with the nearby vehicle as the state supplementary information at a time of the determination of the dangerous driving.

8. The information processing apparatus according to claim 1, further comprising an information recording section configured to record the state supplementary information acquired by the supplementary information acquiring section in association with a result of the determination of the dangerous driving acquired by the dangerous driving determining section.

9. The information processing apparatus according to claim 8, wherein the supplementary information acquiring section is further configured to add the driving information, covering a time period in reference to a timing of the determination of the dangerous driving, to the result of the determination of the dangerous driving.

10. The information processing apparatus according to claim 1, further comprising:
an information recording section configured to record the state supplementary information; and
an information transmitting section configured to transmit, to an information management apparatus, a result of the determination of the dangerous driving and the state supplementary information recorded in the information recording section.

11. The information processing apparatus according to claim 10, wherein
the information transmitting section is further configured to transmit the result of the determination of the dangerous driving and the state supplementary information associated with the result of the determination of the dangerous driving to the information management apparatus at a transmission timing, and
the transmission timing comprises at least one of a date and a time, a time upon elapse of a specific time period, a time at which an instruction is issued to request or transmit the result of the determination of the dangerous driving and the state supplementary information, or a time at which an amount of the state supplementary information recorded in the information recording section has reached a specific level.

12. An information processing method, comprising:
determining, by a dangerous driving determining section, dangerous driving is underway based on driving information,
wherein the driving information includes a specific image;
recognizing, by a supplementary information acquiring section, a subject from the specific image;
issuing, by the supplementary information acquiring section, an information acquisition instruction based on the determination of the dangerous driving by the dangerous driving determining section,
wherein the issuance of the information acquisition instruction includes presentation of the specific image in which the recognized subject is provided with a tag; and
acquiring, by the supplementary information acquiring section based on the presentation of the specific image in which the recognized subject is provided with the tag, state supplementary information that indicates a user objection to the determination of the dangerous driving.

13. The information processing apparatus according to claim 8, wherein
the information processing apparatus is mountable on a vehicle,
the driving information indicates at least one of a steering angle of a steering wheel of the vehicle, an engine speed of the vehicle, or an acceleration of the vehicle, and the dangerous driving determining section is further configured to add at least one of vehicle information or driver information to the result of the determination of the dangerous driving.

\* \* \* \* \*